No. 784,625. PATENTED MAR. 14, 1905.
E. A. MOORE & F. HOLLAND.
MACHINE FOR HEADING BOLTS.
APPLICATION FILED AUG. 23, 1901.

Witnesses:
F. G. Campbell.
E. A. Jarvis.

Inventors:
E. A. Moore and
Franklin Holland.
By their Attorney.
F. H. Richards.

No. 784,625. PATENTED MAR. 14, 1905.
E. A. MOORE & F. HOLLAND.
MACHINE FOR HEADING BOLTS.
APPLICATION FILED AUG. 28, 1901.

Witnesses:
F. G. Campbell
C. A. Jarvis

Inventors:
E. A. Moore &
Franklin Holland,
By their Attorney,
F. H. Richards.

No. 784,625. PATENTED MAR. 14, 1905.
E. A. MOORE & F. HOLLAND.
MACHINE FOR HEADING BOLTS.
APPLICATION FILED AUG. 28, 1901.

Witnesses:
F. F. Campbell
C. A. Jarvis

Inventors:
E. A. Moore, and
Franklin Holland.
By their Attorney,
F. H. Richards.

No. 784,625. PATENTED MAR. 14, 1905.
E. A. MOORE & F. HOLLAND.
MACHINE FOR HEADING BOLTS.
APPLICATION FILED AUG. 28, 1901.

Witnesses:
F. G. Campbell
C. A. Jarvis.

Inventors
E. A. Moore and
Franklin Holland;
By their Attorney.
F. H. Richards.

No. 784,625.

Patented March 14, 1905.

UNITED STATES PATENT OFFICE.

ETHELBERT A. MOORE, OF NEW BRITAIN, CONNECTICUT, AND FRANKLIN HOLLAND, OF BALTIMORE, MARYLAND, ASSIGNORS TO THE STANLEY WORKS, A CORPORATION OF CONNECTICUT.

MACHINE FOR HEADING BOLTS.

SPECIFICATION forming part of Letters Patent No. 784,625, dated March 14, 1905.

Application filed August 28, 1901. Serial No. 73,538.

*To all whom it may concern:*

Be it known that we, ETHELBERT ALLEN MOORE, residing at New Britain, in the county of Hartford and State of Connecticut, and FRANKLIN HOLLAND, residing at Baltimore, in the State of Maryland, citizens of the United States, have invented certain new and useful Improvements in Machines for Heading Bolts, of which the following is a specification.
Our invention relates to bolt-heading machines, and more particularly to that class of said machines for forming what are known as "hinge-pins"—*i. e.*, pins which unite the leaves of butt and other hinges—although it is not limited to the production of such articles, for by changing the dies blanks with heads of various configurations may be made in the same machine, if desired.

In a concurrently-pending application filed July 8, 1901, Serial No. 67,495, we have illustrated and described a bolt-heading machine in which some of the features hereinafter described are disclosed, and in said machine the head is formed on the end of a rod or wire advanced by main and auxiliary feed mechanisms, and the headed bolt or pin is severed from the stock by cutters operative independently of the gripping-dies, which in said machine have opening and closing movements to clamp and release the rod at the proper times, but have no lateral motion to shear a blank from the stock rod. In our present machine the stock rod is fed to the gripping-dies by but one feed mechanism, and said dies are at a subsequent period moved laterally to sever a blank from the rod, which blank is then upset by a series of operations to form a head of the desired configuration and is finally carried back to a position in line with the rod, it being expelled from the gripping-dies when the next feed motion takes place.

Primarily the object of our invention is the provision of a bolt-heading machine having improved feed mechanism for advancing material to a position where it may receive the impact of a heading die or dies, improved means for actuating the side-forming dies, and improved means for actuating the header-slide and various parts of the machine, all as will be hereinafter explained.

A further object of the invention is the provision of gripping-dies and of mechanism for so actuating said dies that they will be opened at the time the feed takes place, will then be closed upon the stock and moved laterally to sever a blank therefrom, and after the heading operation has been completed will cary the finished blank into line with the rod, so that upon the next feed movement the advancing rod will expel the blank from said dies.

A further object of the invention is the provision of means for slightly advancing the blank after the preliminary heading operations, so that the partially-formed head will be brought into proper position for receiving the pressure of the side-forming dies, which sustain and shape the same during the final heading operations.

A further object of the invention is the provision of a device for tripping the feed-pawl and of means for actuating said device at the proper time in the cycle of operation of the machine.

In the accompanying drawings, Fig. 2 is a side elevation of the machine, a part thereof being represented in section. Fig. 11 90 is a similar view showing the gripping-dies moved laterally to sever a blank from the stock rod. Fig. 12 is a view similar to Figs. 10 and 11, showing the gripping-dies closed upon the blank, which has been subjected to the second upsetting operation. Figs. 13 and 13$^a$ represent sectional details of the die mechanism of the machine and illustrate, respectively, the partially-formed head of the blank after the same has been acted upon by two of the heading dies or punches. Figs. 14, 14$^a$, and 14$^b$ are partial sectional views of the die mechanism, illustrating the last operations in forming the head on the blank. Figs. 16 and 17, Sheet 2, are views in elevation of the pawl-and-ratchet feed mechanism at different stages of its operation.

Like numerals designate similar parts throughout the several views.

Referring to the drawings, the numeral 5 designates the frame of the machine, which may be of any desired kind, size, form, and proportions suitable for the purpose, said frame as shown being in the shape of a heavy casting having feet 5' 5$^2$, a laterally-projecting die-chamber 5$^3$, and a depending portion 6, the latter receiving the parts for actuating the slide carrying the heading dies or punches hereinafter described.

Figures 2, 16, 17:
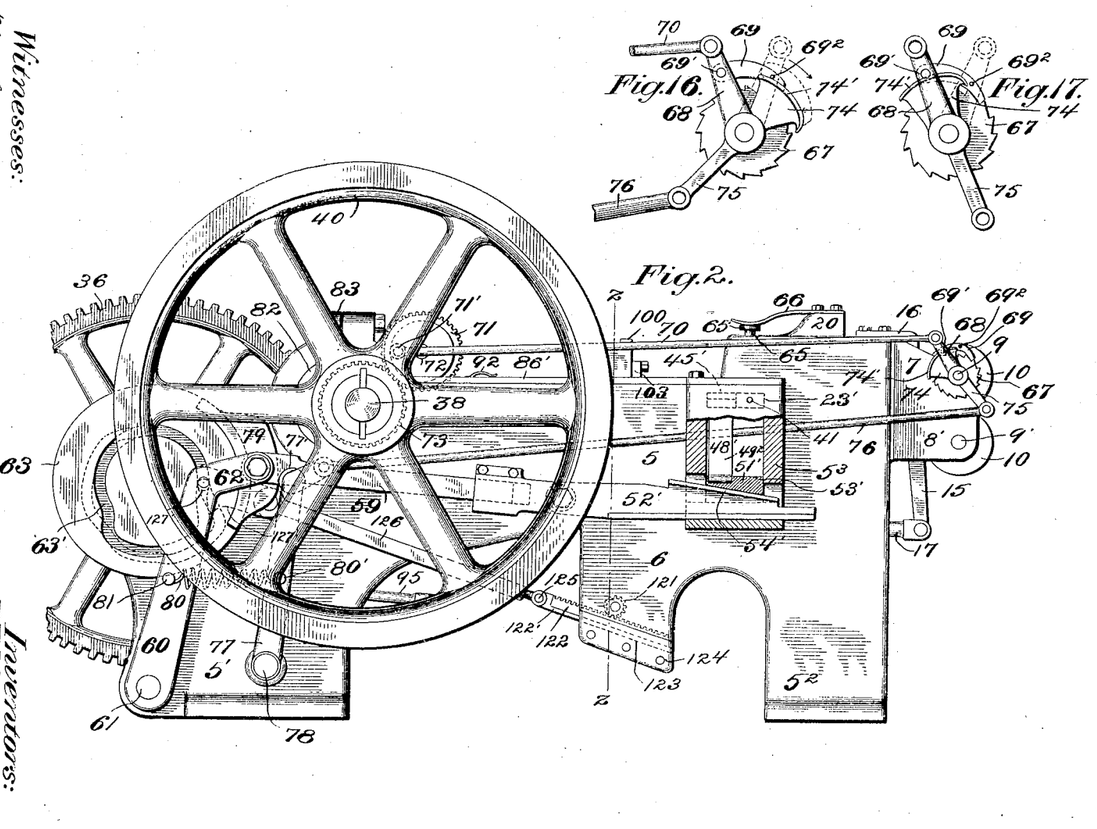
Figure 3:
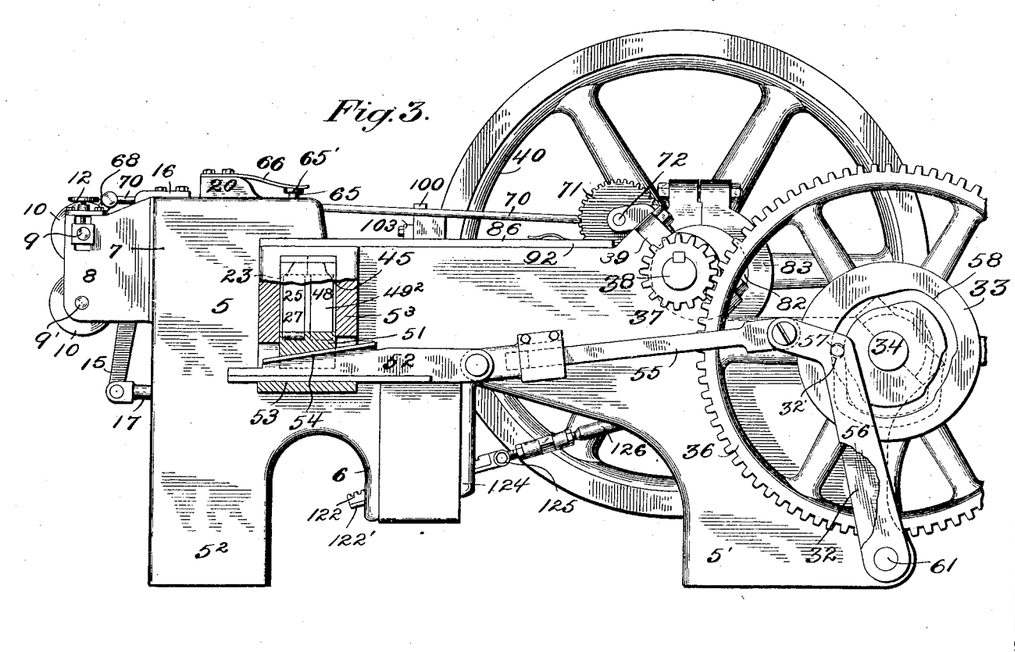
Fig. 3 is an elevation of the opposite side of the machine, parts being in section.
Figure 4:
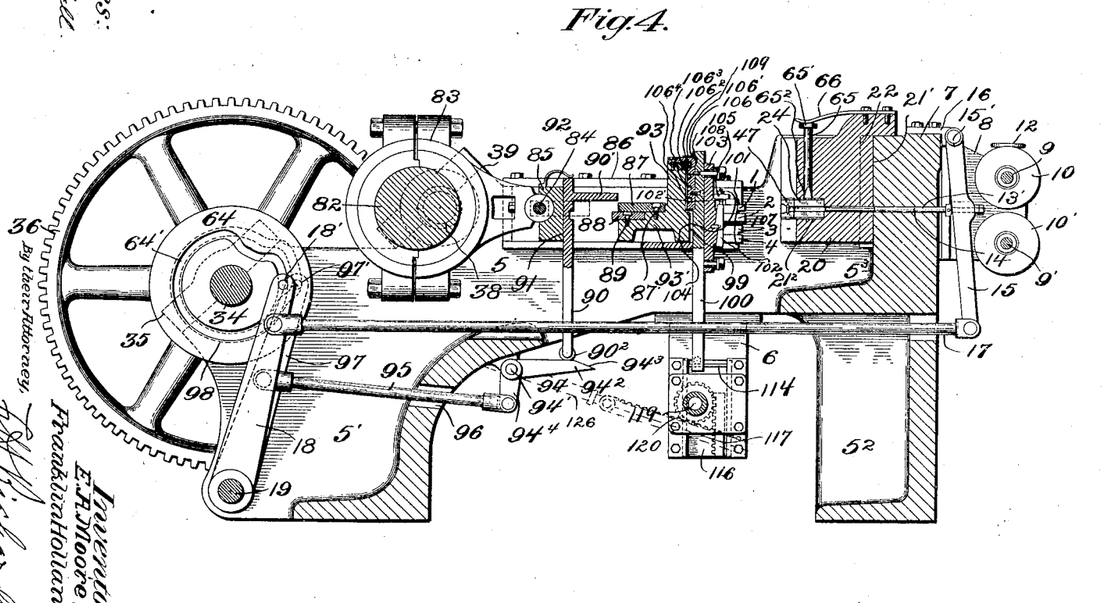
Fig. 4 is a longitudinal vertical section on line *w w* of Fig. 80 1.

Projecting laterally from the die-chamber 5$^3$ is an extension 7, preferably integral with frame 5, although it may be made separate therefrom and bolted thereto, if desired, and secured to said extension are brackets 8 8', and in these brackets are journaled the shafts 9 and 9', respectively, of a pair of feed-rollers 10 10', employed for advancing the stock rod to the machine, said shafts being mounted in suitable journal-boxes, the upper ones of which may be adjusted in the usual manner by screws 12 12'. Formed in the extension 7 and longitudinally thereof are perforations or openings 13 13', the former being in line with the feed-point of the grooved peripheries of the rolls 10 10', and within the perforation or opening 13' is fitted a plunger 14, secured at its outer end to a lever 15, the latter being pivoted at 15' to a bracket 16, bolted to the top of the frame 5, and being articulated at its free end to a pitman 17, connected to a lever 18, mounted on a rock-shaft 19, journaled in the lower part of the frame, as shown in Figs. 2 and 4, said lever having a wrist-pin 18', fitted in a cam-groove 64' of a disk 64, secured to the cam-shaft 34.

Figures 5, 6, 7, 8, 9:
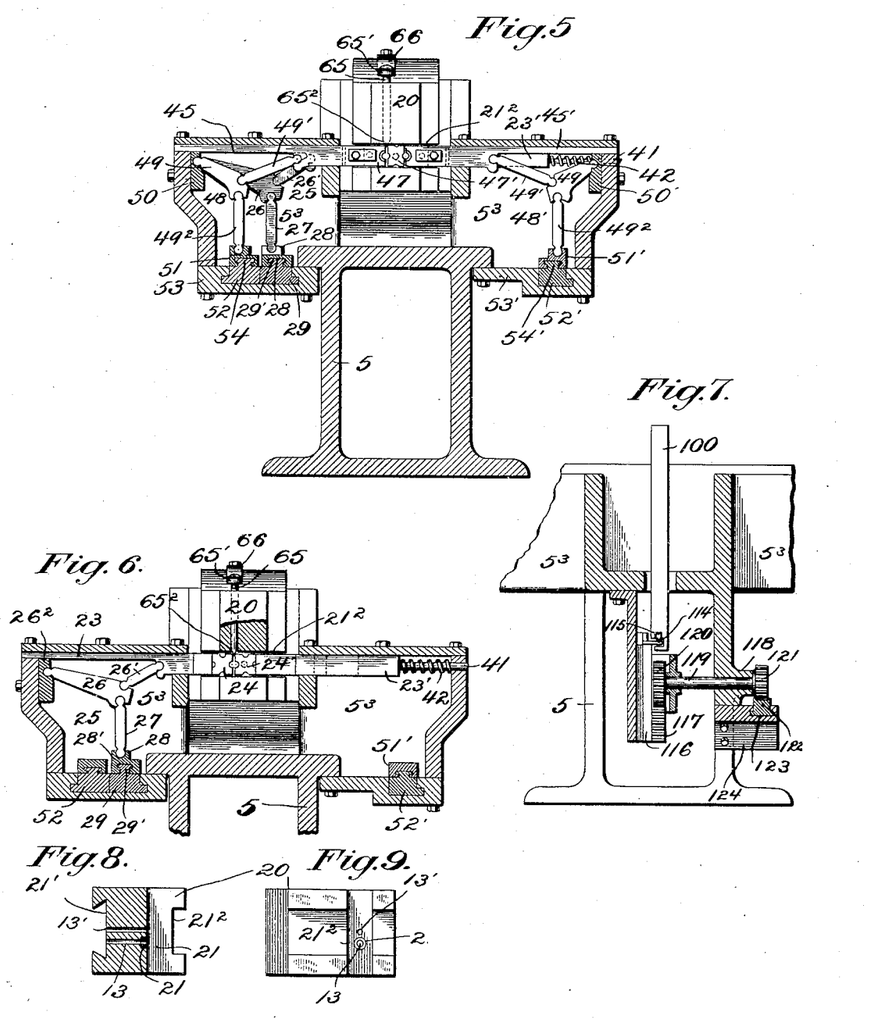
Fig. 5 is a transverse section on line *x x*, Fig. 1, looking in the direction of the arrow.
Fig. 6 is a transverse section on line *y y*, Fig. 1, also looking in the direction of the arrow.
Fig. 7 is a partial section on line *z z* of Fig. 2.
Figs. 8 and 9 are respectively sectional and plan views of the die-block of the machine.
Figure 10:
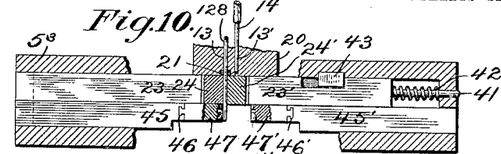
Fig. 10 is a view, partly in plan and in section, of the cut-off, gripping, and forming dies at one stage of the operation.

Within the chambered lateral extension 5$^3$ and the extension 7 thereof is fitted a die-block 20, through which the perforations 13 13' are continued, and this die-block carries a steel cut-off bushing 21, through which the rod is advanced by the feed-rollers, as will be hereinafter set forth, and said die-block is preferably provided with a recess 21', having dovetailed walls on its rear side which fit over a correspondingly-shaped tongue or projection 22 on the extension 7, as shown by dotted lines in Figs. 1 and 4, and on its cut-off face said die-block has a longitudinal guideway 21$^2$ for the reception of the dies and their actuating-slides hereinafter described. Fitted within guides of the frame and the way 21$^2$ of die-block 20 are slides 23 23' for actuating the gripping-dies 24 24' of the machine, and these dies are of the usual kind and are provided with stock-receiving grooves upon their sides and are interchangeable and also reversible to bring the desired grooves into position for operation. For actuating the gripping-dies toggle mechanism (designated in a general way by 25) is employed, as shown in Figs. 5 and 6, and this mechanism consists in the form illustrated of two toggle-links 26 26', the former having a ball-shaped or globular end located in a seat of a block 26$^2$, secured to the frame, and the latter having similarly-shaped extremities fitted in sockets of the slide 23 and of link 26. To the link 26 is also connected a link 27, the globular ends of which are fitted in sockets of said link 26 and of a block 28, the latter having a wedge-shaped T-groove 28' on its under side, with which engages a similarly-formed tongue 29', carried by a slide 29, reciprocable in ways on the bottom plate of the chambered part 5$^3$ of the machine-frame and articulated at its inner end at 30 to a connecting-rod 31, pivoted to a lever 32, carried by a rock-shaft in the bed of the machine and having a stud 32', which fits in a cam-groove in the inner side of a disk 33, secured to a shaft 34, journaled in bearings of brackets 35 35', projecting from the rear end of the machine-frame. Upon this disk or wheel 33 is a large gear-wheel 36, actuated by a pinion 37, secured to a shaft 38, journaled in separated bearings 39 39' of the machine-frame 5, said shaft being rotated by a fly or band wheel 40, connected to the end thereof opposite from the pinion 37. The slide 23', against the end of which the side of the gripping-die 24' rests, is provided with a stem 41, sliding through a perforation in the side wall of the chamber 5$^3$, and surrounding the stem between said side wall and the outer end of the slide is a spiral spring 42. This die-slide 23' is grooved or slotted in one of its sides at 23$^2$, and fitted within this slot is a block 43, secured to the wall of the chamber 5$^3$ by screws 44, said block acting as a stop to limit the outward motion of the slide and the spring 42 serving to return the slide and the gripping-die controlled thereby to their normal positions when the opposite gripping-die slide 23 is withdrawn by the toggle mechanism 25. Fitted for transverse movement on the front of the die-block 21 at one side of the gripping-die slides 23 23' are slides 45 45', respectively, to the ends of which are detachably secured by tongue-and-groove connections 46 46' or in any other desired way forming-dies 47 47', which serve to shape the sides of the bolt-head to the desired contour. These forming-die slides 45 45' are actuated by toggle mechanism 48 48', similar to the toggle mechanism 25, each mechanism being composed of three links 49 49' 49², the links 49 having globular ends fitted in sockets or blocks 50 50, secured to the inner side walls of the chamber 5³, and the links 49² also having similarly-shaped extremities, the upper ones of which are fitted in sockets of the toggle members 49 and the lower in sockets of blocks 51 51', having T-shaped grooves on their under sides, as shown in Figs. 5 and 6. For simultaneously actuating the forming-die slides through their toggle mechanism as described wedges 52 52' are employed, said wedges reciprocating in rabbeted grooves or ways of the base-plates 53 53' of the chamber 5³ and each wedge being formed with an inclined tongue or T-shaped tenon 54 54', respectively, for engaging with the grooved blocks 51 51'. For synchronously actuating the wedges 52 52' the wedge 52 is connected by a pitman or rod 55 to a pivoted lever 56, said lever having a wrist-pin 57 fitted in a cam-groove 58 of the disk 33 and the wedge 52' being similarly connected by a pitman 59 to a lever 60, pivoted at 61 to the machine-frame and carrying a wrist-pin 62, which fits within a cam-groove 63' in the side of a disk 63, secured to the cam-shaft 34. Inasmuch as the cam-grooves 58 and 63' are alike, when the cam-shaft 34 is rotated it will be obvious that through the connections described the wedges will be simultaneously reciprocated and caused to raise the blocks 51 51', thereby through links 49² straightening the toggles 49 49' and simultaneously forcing the forming-dies 47 47' upon the head of the bolt. The groove 58 has in this instance two faces to advance the wedge and a comparatively short face to retract the same during the secondary feed and a face to retract said wedge during the main feed.

Mounted in the die-block 20 is a plunger 65, having a head 65' at one end and a beveled or wedge-shaped point 65² at its opposite extremity, and secured to said die-block is a flat spring 66, the end of which bears against the head 65' of the plunger and tends to force said plunger downward, the result being that when the gripping-dies 24 24' come to a position where the beveled point 65² of said plunger can enter between them they will be forced apart, and thereby opened, sufficient play of said dies for this action being permitted in the groove 21³ of the die-block in which the gripping-die slides 23 23' and said dies are mounted.

Figure 1:
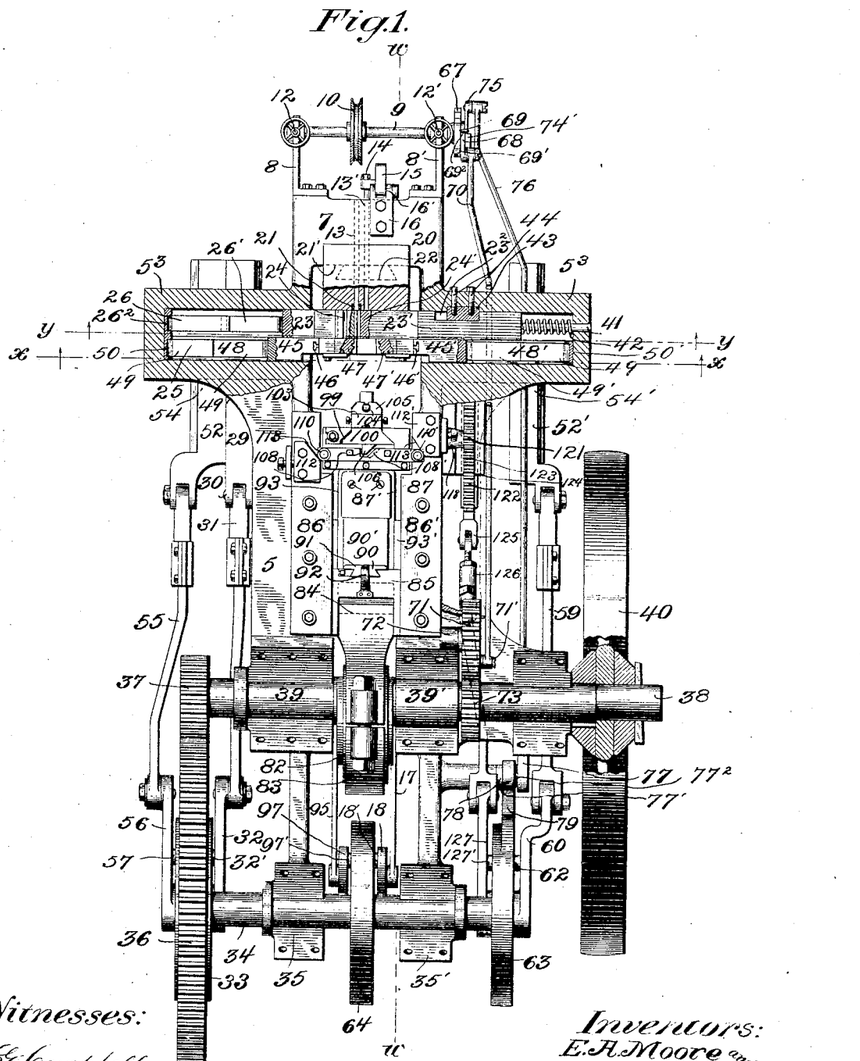
Figure 1 is a plan view of our improved machine.

For causing the feed-rollers 10 10' intermittingly to advance the rod through the perforation or opening 13 of die-block 20 we secure to the shaft 9 of the upper feed-roller 10 a ratchet-wheel 67, and loosely mounted on said shaft 9, so that it may freely swing around the same, is an arm 68, carrying a pawl 69, pivoted to said arm at 69', and articulated to the upper end of arm 68 is a pitman or connecting rod 70, sleeved at its inner end upon a wrist-pin 71' of a gear-wheel 71, mounted on a short or stub shaft 72, laterally projecting from a part of the frame, as shown more particularly in Fig. 1, said gear-wheel 71 being driven by a pinion 73, secured to the shaft 38, which is in turn actuated by a belt (not shown) applied to the wheel 40, above described. As will be noticed, the arm 68 will be actuated back and forth once during each rotation of the gear-wheel 71, and if the pawl 69 were permitted to engage the teeth of ratchet-wheel 67 at each movement of the arm 68 the feed would be intermittent and at short intervals while the machine is in operation. In the construction of our machine, however, it is necessary to arrest the feed at certain times and then permit the pawl to act to advance the ratchet-wheel, thereby turning the rollers 10 10' to cause them to project the stock rod between the then open gripping-dies with its end slightly advanced beyond the inner faces of said dies, and to prevent the pawl from acting except at the proper period in the timing of the machine we have provided a segment 74, having a flanged periphery 74', said segment constituting a part of or being attached to an arm 75, also loosely mounted on the feed-roll shaft 9 adjacent to the inner side of the arm 68 and this arm 75 being articulated at its lower end to a pitman or connecting rod 76, pivoted to the deflected upper extremity of a lever 77, attached to a rock-shaft 78 or other suitable pivotal support of the machine-bed. This lever 77 carries near its upper end a laterally-projecting stud 77², upon which may be mounted an antifriction-roller 77', the latter being in contact with a cam 79 on the periphery of the disk 63 and being caused to engage said cam and disk by means of a spring 80, secured to said lever at 80' at one end and to a stud or other projection 81 at its opposite end, as illustrated in Fig. 2. This peripheral cam 79 occupies about one-fifth of the periphery of the disk 63, and during the rotation of the shaft 34 said cam 79 will bear against the roller 78 and force the connecting-rod 76 and lever 75 to the position represented in Figs. 2 and 17, thereby permitting the pawl 69 to drop upon the ratchet-wheel 67 and to turn said wheel during the time occupied in the passage of the cam 79 along the roll 77'; but after said roll leaves the cam the spring 80 will pull back the lever 77, to which it is attached, the rod 76, and the arm 75 and will thereby throw the segment 74 in the direction of the arrow to the position shown in Fig. 16. As said segment is thrown to such position the flange 74' thereof comes into contact with a pin 69² on pawl 69, thereby raising said pawl to the position shown in the figure mentioned and holding it in such position until the proper time elapses in the cycle of movements of the various parts of the machine to again bring the feed mechanism into action for advancing the stock rod to the dies.

Secured to the shaft 38 between the bearings 39 39' of the frame is an eccentric 82, the usual divided strap 83 of which is connected by a knuckle-joint 84 to a block 85, the latter being reciprocable in ways 86 86' of the machine-frame 5, as illustrated in Fig. 1.

Designated by the numeral 93 is a header-slide provided with a lateral offset 93', in a rabbeted portion of which a hardened wear-plate or abutment 87 is detachably secured by screws 87' or otherwise, as shown in Fig. 4, and also detachably fastened to this lateral offset of the header-slide 93 and below the wear-plate 87 is a hardened block 88, secured in position by a screw or screws 89, said plate projecting over the rear end of the header-slide and serving to sustain an arm 90', extending laterally from a vertical slide 90, which bears at its lower end an antifriction-roller 90². The part 90' of slide 90 constitutes what is known in the art as a "gagger-plate," the back of the slide 90 being fitted, as by a dovetail or other guide 91, in way of the block 85, as illustrated in Fig. 1. Bearing upon the top of slide 90 and over the dovetailed portion 91 thereof is a spring 92, secured at one end to the block 85, and the free end of said spring normally tends to force slide 90 downward, so that the plate 90' will rest upon the block 88 with its forward end in engagement with the abutment 87, and when in this position the eccentric 82 as it rotates will, through the connections described, reciprocate the header-slide, as will be obvious.

At times during the peculiar operation of our improved machine the header-slide must remain idle, and to enable this result to be accomplished the block 85 is fitted in the guideways 86 86', and to this block the strap of the eccentric is connected by the knuckle-joint 84, as above described. This block is, as just stated, provided on its front face with a dovetailed guideway in which reciprocates the slide 90, and when said slide is forced downward by the spring 92, secured to the block, (the free end of such spring bearing upon the top of the slide,) the block as it reciprocates will of course carry the header-slide 93 with it and will cause the heading die or tool then in position to upset the end of a blank held by the gripping-dies.

For raising the vertical slide 90 an angle-lever 94 is employed, said lever being pivoted at 94' to the framework and consisting of a comparatively long arm 94², having a beveled free end 94³, and a shorter arm 94⁴, the latter being articulated at its extremity to a pitman or connecting rod 95 passing through an opening 96 in the frame, said pitman being connected at its opposite end to a pivoted lever 97, having a stud carrying an antifriction-roll 97', fitted in a cam-groove 98. (Shown by dotted lines in Fig. 4 on the left-hand side of the disk 64.) This cam-groove 98 is so formed that it will actuate at the proper times the lever 97 and the connections therefrom to the slide 90 and will raise said slide and its gagger-plate 90' to the position shown in Fig. 4 when in the proper timing of the machine it is desired to have the block 85 reciprocate idly in the guideways 86 86' without actuating the header-slide 93.

Figures 11, 12, 13, 13A, 14, 14A:
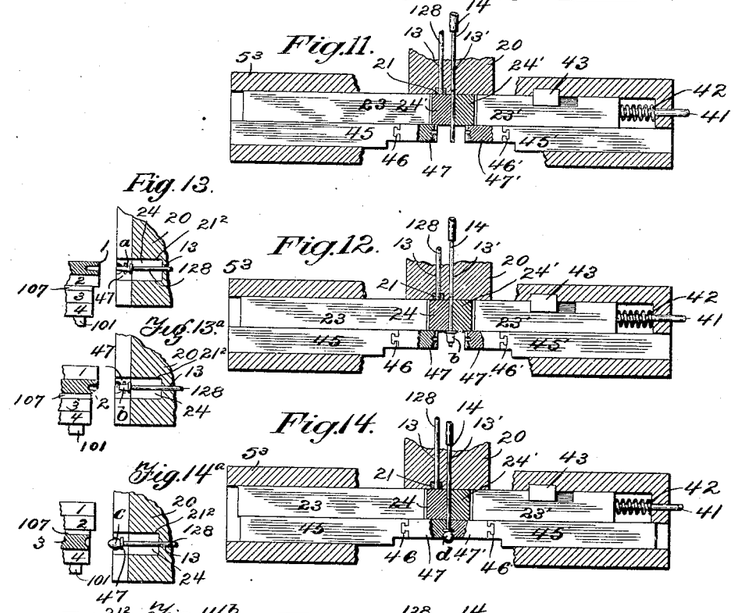
Figures 14B, 15A:
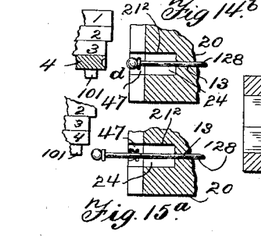
Figure 15:
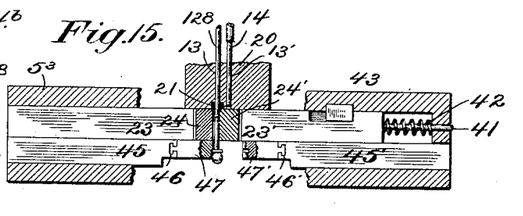
Figs. 15 and 15$^a$ are similar views illustrating the position of the die mechanism just after the completion of the heading operations.

As will be seen by reference to Figs. 1 and 4, the forward end of the header-slide 93 is provided with a guideway 99 for the reception of a vertically-reciprocatory slide 100, to which the heading dies or punches are secured. These heading-dies are, as illustrated in Figs. 4, 13, 13ª, 14ª, 14ᵇ, and 15ª, four in number, and they are secured in a guideway of a plate 101, adjustably connected by screws or otherwise to the slide 100. The heading-dies are designated, respectively, by the numerals 1, 2, 3, and 4, and in Figs. 13 and 13ª, 14ª and 14ᵇ they are represented in section in the order in which they act upon the work. Each of the heading dies or punches rests at its rear end against the straight front surface of a plate 102, and the rear surface of said plate is of wedge-like formation and bears against a complemental wedge-surface on a plate 103, adjustably secured to the slide 100. By adjusting this plate 102 the dies 1 to 4, inclusive, may be forced outward in front of the header-slide, and for accomplishing this purpose said plate is provided with a stem 102', upon which is threaded a nut 104, said nut bearing against a lateral extension 105, projecting from the plate 103. Secured to the rear side of the slide 100 is a locking-block 106, having a series of four separated notches 106' 106² 106³ 106⁴, said notches corresponding in number to the number of heading-dies employed. Here it is to be stated that the heading-dies are spaced apart in pairs from each other by means of a filling piece or strip 107, as illustrated in Fig. 4. Coöperating with this locking-block is a locking plate or bar 108, having an inclined dog or pawl 108', said locking-plate being fitted for horizontal movement in a seat of the header-slide 93, in which seat it is held in place by a cap 109, said cap being removed in Fig. 1. When the plate 108 is reciprocated in one direction, the inclined surface or pawl 108' thereof is caused to enter the one of the inclined locking seats or notches of the block 106 which is opposite thereto and to thereby lock the slide 100 and the heading-tools carried thereby firmly in position during the stroke of the header-slide. At each end the sliding locking-plate 108 is equipped with antifriction-rollers 110 110', respectively, which as the header-slide reciprocates bear against hardened-steel plates 112 112', secured to the frame, said plates having inclined surfaces 113 113', against which the rollers bear as the header-slide moves back and forth. As the header-slide moves forward the roller 110' will bear against the inclined portion of the plate 112', thereby causing the locking-slide to be forced laterally and throwing the wedge-shaped dog 108' thereof into the inclined seat of the locking-block 108, which is then in line therewith, and when the header-slide is retracted the roller 110 will bear against the inclined surface 113 of plate 112 and will force the locking plate or slide in the opposite direction, thereby withdrawing said dog from its seat and releasing the slide 100. At its lower end this slide 100 is fitted upon a guide bar or plate 114, extending across a slide 116 in the depending portion 6 of the machine-frame and is preferably also provided with an antifriction-roller 115, which rides upon said guide-bar as the header-slide reciprocates, said depending portion 6 of the machine-frame being formed with a guideway, in which is fitted for reciprocation said slide 116, which carries the guide-bar and a rack 117. Passing through a bearing 118 of the portion 6 of the machine-frame is a short shaft 119, carrying at its inner end a pinion 120, the teeth of which are in engagement with the rack 117, secured to the slide 116, and at its outer end said shaft is provided with another pinion, 121, in engagement with a rack 122, which has a tongued portion 122', fitted in a seat 123 of an inclined bracket 124, secured to the frame, and for actuating this rack at the proper times it is connected at 125 to an adjustable pitman 126, the latter being articulated at its extreme inner end to a pivoted lever 127, having a wrist-pin or stud 127', which enters a cam-groove on the left-hand side of the disk 63. The mechanisms for actuating the header-slide and for controlling the movements of the heading dies or punches 1 to 4, inclusive, are substantially the same as those illustrated and described in our concurrently-pending application, Serial No. 67,495, above referred to, and will therefore require no further explanation.

Our improved machine, as thus far described, operates as follows, viz: In Figs. 1 to 4, inclusive, the machine is shown at the beginning of a cycle of operation, with the pawl 69 in the position represented in Figs. 2 and 17—$i.\ e.$, in engagement with the teeth of ratchet-wheel 67—the wrist-pin of the gear-wheel 71, to which the pitman 70 is connected, being about on a line horizontal with the axis of the shaft 72 and the segmental plate 74 for lifting the pawl being swung back by the arm 75, pitman 76, lever 77, and cam 79 of disk 63, secured to the cam-shaft 34. In these positions of the mechanism the pinion 71 as it rotates will, through the connections described, actuate the rollers 10 10' and cause them to feed the stock-rod 128 through the gripping-dies 24 24', which are then open, as shown in Fig. 6. This feed motion continues for about one-fifth of a rotation of the cam-shaft 34, or while the roller 77' of lever 77 is in contact with the active surface of cam 79; but when the roller passes off from said cam it is forced by spring 80 against the concentric part of the periphery of disk 63, where it remains during the remaining portion of one rotation of said disk. This action of spring 80 upon lever 77, carrying the roller 77', pulls back the connecting-rod 76 and, through arm 75, shifts the segmental plate 74, which raises the pawl and stops the feed, said pawl reciprocating idly upon the plate, as shown by dotted lines in Fig. 16, with which its pin $69^2$ is in engagement, until the cycle of operation is completed, when it will be again permitted to drop to start a new feed. Toggle mechanism 25 is then actuated by the mechanism heretofore described to cause the slide 23 to force the gripping-die 24 to clamp the rod against the opposing die 24', and then both dies are forced laterally (the slide 23' yielding, as described) until this movement is arrested by the stop 43. (Shown in Figs. 1 and 10 to 15, inclusive.) During this lateral movement of the gripping-dies they will sever a blank from the rod by shearing the same against the bushing 21 in die-block 20 and will carry the blank to the position shown in Fig. 11, with its end projecting in front of said dies. While the action just described is taking place the gagger-plate 90', carried by the vertical slide 90, is in the position represented in Fig. 4, and the block 85 therefore reciprocates idly back and forth in its guideways without actuating the header-slide; but after the gripping-dies have been brought to the position illustrated in Fig. 11 the angle-lever 94 is swung rearward on its pivot 94' by the lever 97 and cam 98, thereby withdrawing its arm $94^2$ from the roller $90^2$ on said slide 90 and permitting the slide and attached gagger-plate 90' to drop by gravital action, aided, if necessary, by the spring 85. At this time in the cycle of movement of the machine the vertical slide 100, carrying the heading dies or tools 1 to 4, inclusive, is down, as shown in Fig. 4, and the locking-plate 108 is in the position represented in Fig. 1, with its pawl or dog 108' out of contact with the upper notch 106' of the locking-block 106. As the header-slide advances under the action of the eccentric 82 the roller 110' will come into contact with the inclined portion or wedge 113' of the plate 112', and the locking-plate 108 will be forced laterally to cause its inclined dog or tooth to enter said notch 106', thereby locking the parts carried on the front of the header-slide rigidly in position, and during the further advancing movement of said header-slide the die or punch 1 will strike the head of the blank and upset it substantially to the shape shown at $a$ in Fig. 13. After this action has taken place the header-slide and attached tools are withdrawn and said slide is again moved forward, the punch 2 having been brought into line with the end of the blank by means of the cam and pinion-and-rack mechanism described, and said punch will upset the end of the blank into the form shown at $b$ in Figs. 12 and $13^a$ upon the next forward movement of the header-slide; and when this operation has been completed the header-slide again withdraws, the gripping-dies are opened by the mechanism described, and the plunger 14 comes into contact with the end of the blank and advances it so that its partially-headed portion will project slightly farther forward from the face of the gripping-dies, as illustrated in Figs. 14 and $14^a$, and when in this position the flange at the base of the incompletely-headed portion of said blank and the partially-shaped head are so located that they may be readily received by the side forming-dies 47 47', which are then simultaneously advanced to close upon the head by the slides 45 45' and the toggle and wedge mechanisms described. While these operations are taking place, the slide 100 has been raised by the pinion-and-rack mechanism described to bring the heading die or punch 3 into line with the blank, and the header-slide, again advancing, causes said die further to upset the head and to bring it substantially to the shape shown at $c$ in Fig. $14^a$. The header-slide now withdraws and the slide 100 is again raised to bring the finishing heading-die 4 into line with the end of the blank, and upon the next forward reciprocation of said header-slide this die strikes the head (shaping it to the form shown at $d$ in Figs. 14 and $14^b$) and completely finishes the same. The forming-die slides are then withdrawn by the mechanism described, and the gripping-slides are also moved to their original positions, carrying the gripping-dies with the finished blank to the position represented in Fig. 15. The gagger-plate is then raised to the position represented in Fig. 4, the slide 100 is dropped, bringing the heading-dies to their normal positions, and upon the next feed of the stock rod 128 the end thereof will engage with the end of the blank and force the same from the gripping-dies. The parts of the machine are now reset for a new cycle of operations, and the work is carried on indefinitely as long as the machine is in operation, as above described, a complete headed blank being formed at each rotation of the cam-shaft 34.

Figure 18:
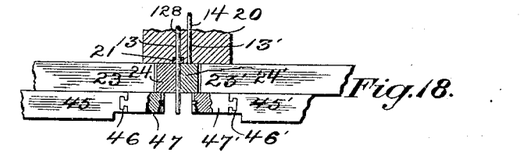
Figs. 18 to 22, inclusive, are views of die mechanism similar to that shown in Figs. 10 to 15, but so modified and arranged that the head is completely formed on the end of the stock rod before the gripping-dies move laterally to sever the headed blank from said rod.
Figures 18A, 19, 19A, 20, 20A, 21, 21A:
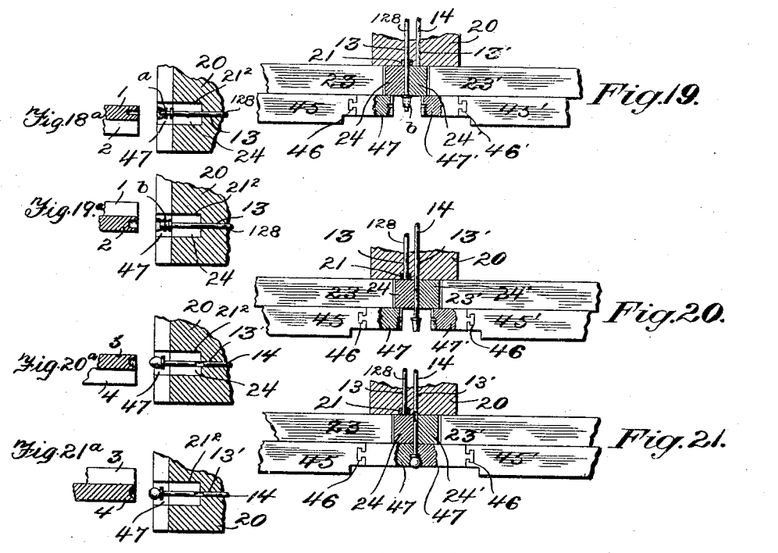
Figure 22:
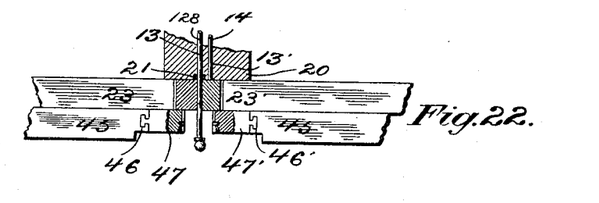

In the modification of the gripping and forming die mechanism of the machine illustrated in Figs. 18 to 22, inclusive, the projecting end of the stock rod or wire 128 is first upset by the heading-punches 1 and 2 (which are preferably carried by a single slide) to form the preliminary heads $a$ and $b$ upon each end, and after these operations the gripping-die slides 23 and 23' are moved laterally to sever, in connection with the cut-off bushing 21, such blank from the rod and bring it into line with the plunger 14, which then advances in the manner above described to project the blank from the positions shown in Fig. $19^a$ to the position represented in Fig. 20, where the partially-formed head is properly located to receive the impact of the side-forming dies 47 47', which are simultaneously advanced to close upon the same by the slides 45 45', operated by the wedge-and-toggle mechanism set forth, and while between the forming-dies the partially-formed head of the blank is further upset by the heading dies or punches 3 and 4 (also preferably carried by a single slide) and is brought to its finished form. After the head has been completed on the blank in this manner the forming-dies are withdrawn, as shown in Fig. 22, and the gripping-die slides are moved to the position shown in said figure, and upon the next operation of the feed mechanism the finished blank is ejected by the advancing stock rod from the machine. It will be noticed that in both forms of the gripping and forming die mechanisms described a partially-headed blank is projected a slight distance in front of the gripping-dies after said blank has been severed from the stock rod and also that in both of said forms the finished blank is ejected from the dies by the stock rod as it is again advanced by the feed mechanism.

Our invention is not limited to the specific devices shown and described for carrying out the various operations, for feed mechanism different from that shown may be employed, if desired, and the cams and other details may be variously modified, provided they are capable of imparting the necessary movements in sequential order to the various parts of the machine. Furthermore, the invention is not limited to the use of a series of four heading dies or punches, for with slight modifications of the machine any desired number may be employed.

Having thus described the invention, what we claim, and desire to secure by Letters Patent, is—

1. In a bolt-machine the combination with heading mechanism adapted to perform a series of operations upon a blank, of a die-block; gripping-dies; means to move the same to sever a blank from the stock-rod and to open the gripping-dies preliminary to the advance of the blank; forming-dies; and means to advance the blank through the gripping-dies after the performance of a portion of said series of operations to place its partially-formed head out of contact with the gripping-dies and into position to be acted upon by the forming-dies and heading mechanism in the remainder of said series of operations.

2. In a bolt-machine, the combination with stock-feeding mechanism, of means to carry the stock end of the rod; gripping-dies adjacent thereto to engage the blank end of the rod and having a shearing relation therewith; yieldable means to close the dies; means to shift the dies to sever a blank from the stock and to move such severed blank from its original position; means for preliminarily upsetting the end of said blank to form a partial head thereon; means to advance the partially-headed blank through the gripping-dies; means to open the gripping-dies preliminary to such advance; forming-dies; means to actuate said forming-dies; and means to finish the head of the blank while the forming-dies are closed upon the head-receiving end of said blank.

3. In a bolt-machine the combination with a die-block having a cut-off device, of gripping-dies through which the stock is fed; preliminary heading mechanism; means for moving the dies laterally to sever a blank from a rod fed through the die-block; forming-dies; means for actuating the forming-dies; means for advancing the partially-headed blank through the gripping-dies to place its head in position to be acted upon by the forming-dies; means to open the gripping-dies preliminary thereto; and mechanism for finishing the head of said blank.

4. In a bolt-machine, the combination, with stock-rod-feeding mechanism, of a die-block having an opening through which the rod is fed, a bushing in said die-block constituting a cut-off surface; gripping-dies movable back and forth on the face of said die-block, and adapted to sever a blank from the rod, to carry it in front of the heading mechanism, and to return the headed blank to a position in line with the feed-opening of the die-block, where it will be ejected by the stock rod upon the next feed movement; mechanism for actuating said gripping-dies; heading mechanism; means for actuating said heading mechanism; forming-dies; mechanism for operating the forming-dies; and means to feed the stock.

5. In a bolt-machine, the combination with feed mechanism, of a die-block having a feed-passage through which a rod is fed by said mechanism; gripping-dies movable back and forth upon the face of said die-block, and adapted to sever a blank from the rod, to carry it in front of heading mechanism, and to return the blank after it has been headed to a position in line with the feed-passage of the die-block; means for actuating said gripping-dies; preliminary heading mechanism; means to actuate the same; means to advance the blank in the gripping-dies; forming-dies in front of the gripping-dies; means to actuate said forming-dies; finishing heading-dies; and means to actuate the same.

6. In a bolt-machine, the combination, with gripping-dies, and with means for actuating said dies to cause them to carry a plain blank in front of heading mechanism and to return the headed blank to the original position of said plain blank, of means for preliminarily heading said blank; a device for advancing the blank with its partially-formed head through the gripping-dies; means to open said dies preliminary thereto; means for actuating said device; forming-dies; means for actuating the forming-dies; heading-dies for completing the head on the blank; and means for actuating said heading-dies, substantially as described.

7. In a bolt-machine, the combination, with rod-feeding mechanism, of a die-block having an opening through which the rod is fed; gripping-dies movable laterally back and forth on the face of the die-block, and adapted to sever a blank from the rod; preliminary heading-dies for forming an incomplete head on said blank; finishing heading-dies; forming-dies; means to release the gripping action of the dies; a plunger for pushing the partially-headed blank forward between the gripping-dies during such release; means for actuating said plunger; and means for actuating the finishing heading-dies, substantially as described.

8. In a bolt-machine, the combination of the following instrumentalities: rod-feeding mechanism; a die-block having a cutting-surface through which the rod is fed by said mechanism; gripping-dies movable back and forth with relation to the die-block; means for actuating said gripping-dies to close them upon the rod, and to move them laterally to sever a blank from said rod and to carry said blank to the position where it receives the impact of the heading mechanism; preliminary heading mechanism for forming an incomplete head on said blank; means to release the grip of said dies; a device for advancing the partially-headed blank partly through the gripping-dies; means to cause said dies to again grip the blank; forming-dies; mechanism for closing said dies upon the partially-formed head of the blank; heading dies or tools for completing the head of the blank while the same is within the forming-dies; and means for actuating the heading-dies, substantially as described.

9. In a bolt-machine, the combination, with rod-feeding mechanism, of a die-block having a rod-passage; gripping-dies shiftable across the said block and coöperative therewith to sever a blank from the rod; means for opening said dies prior to the feed of the rod and the advance of the blank and for closing the same thereafter, and for returning them to their original position; a header-slide carrying a series of heading dies or punches; forming-dies; means for actuating the forming-dies; a plunger for advancing the blank to a position where it will be acted upon by the forming-dies; and means for actuating the heading-dies transversely of the header-slide.

10. In a bolt-machine, the combination, with means to feed the stock, of blank-gripping dies; means for actuating the gripping-dies to perform their gripping action, to release the same to permit the feed of the blank, and to sever a blank from the stock, and shift the same from the line of the feed of the stock; a plunger for advancing a blank partly through said gripping-dies at the period of release; forming-dies; means for actuating the forming-dies; and means for heading the blank.

11. In a bolt-machine, the combination with preliminary and finishing heading-punches reciprocatory upon parallel lines, of means to feed the stock upon the line of reciprocation of the preliminary punches; gripping-dies and means to actuate the same in their gripping function and to cause the release of the same to permit the feed, and to shift to sever a blank from the stock after the action of the preliminary punches, and to shift the blank from the line of the feed of the stock to the line of reciprocation of the finishing-punches; a plunger to advance the blank on such line to the working point of said punches partly through the gripping-dies and into the reach of forming-dies; and the said forming-dies and means to actuate the same to close on the preliminary head, and to open after the finishing thereof.

12. In a bolt-machine, the combination, with a die-block having perforations in alinement with similar perforations in the machine-frame, of means for feeding a rod through one of said perforations; a pair of gripping-dies movable back and forth in a groove of the die-block and adapted to cut off a blank and carry the same to the working position of the machine; means for actuating said dies to close them upon the rod and move them laterally to cut off a blank, and to release the grip of the dies to permit the advance of the blank; a pair of forming-dies located in front of the gripping-dies; a plunger working in one of the perforations of the die-block and serving to advance the blank partly through the gripping-dies so that its head portion may be acted upon by the forming-dies; cam-and-lever mechanism for actuating said plunger; a header-slide; a series of heading-dies or punches movable across the face of said header-slide; and means for intermittingly actuating the said heading-dies and punches, substantially as described.

13. The combination, with rod-feeding mechanism, of a die-block having a perforation to which the rod is fed by said mechanism, and also having another perforation parallel to the first perforation; a plunger reciprocable therein; gripping-dies reciprocable in a groove of the die-block and coöperative with said die-block as a cut-off; means to reciprocate said dies to cut off a blank from the rod and carry it in front of said plunger and to then partly release the gripping action thereon; means to actuate the plunger and actuate the blank in the gripping-dies; forming-dies and means to actuate the same; a header-slide; means to reciprocate said slide; a series of heading-dies or punches movably mounted on said header-slide; and means to actuate the heading dies or punches in a path transverse to the path of movement of said header-slide.

14. In a bolt-machine, the combination with rod-feeding mechanism, of forming-die mechanisms, preliminary and finishing heading-die mechanism; means to actuate said respective mechanisms; gripping-dies and means to shift the same to shift a blank from its line of feed; a device for advancing a blank after the action of the preliminary heading-die mechanism and while between the gripping-dies to such a position that its head will be acted upon by the forming-dies and the finishing heading-die mechanism; and means for shifting the gripping-dies to return the blank after the same has been headed to a point in line with the path of feed movement of the machine and in position to be ejected by the next feed of the rod.

15. In a bolt-machine, the combination, with rod-feeding mechanism, of a perforated die-block through which the rod is fed by said mechanism and carrying a cut-off face; a pair of gripping-dies mounted in a groove of the die-block; slides for actuating said dies to cause them to clamp the rod, to move laterally and sever a blank therefrom, and to return with the headed blank to their original positions and the blank in position to be ejected by the succeeding feed movement of the rod; forming-dies; means for projecting the blank from between the gripping-dies so that its head will be operated upon by the forming-dies; means for actuating the forming-dies; a header-slide, and preliminary and finishing heading-dies carried by said slide; and means to open the gripping-dies.

16. In a bolt-machine, the combination, with gripping-dies, and with means for actuating said dies, of feed mechanism; forming-dies; a plunger for pushing the blank partially from the gripping-dies so that the head thereof may be acted upon by said forming-dies; a header-slide; a slide movable in ways on the front of said header-slide; and a series of heading dies or punches carried by the last-named slide, substantially as described.

17. The combination, with roller-feed mechanism, of a perforated die-block having a cut-off bushing; a pair of gripping-dies mounted in a groove of said die-block; a slide for actuating said dies in one direction to sever a blank from the rod; a spring for returning said slides and dies; forming-dies; means for actuating said forming-dies; multiple heading mechanism; means to release the gripping-dies; and means for advancing the blank in the gripping-dies between strikes of the heading mechanism thereon, so that its entire head will be acted upon by the forming-dies and a part of the heading mechanism, substantially as described.

18. In a bolt-machine, the combination, with rod-feeding mechanism, of a die-block having a pair of parallel perforations; gripping-dies movable back and forth on the face of said die-block; means for actuating said gripping-dies; forming-dies; means for actuating the forming-dies; a header-slide; a series of heading dies or punches on the face of said header-slide; means for reciprocating said slide to bring the heading dies or punches successively into line with the blank held by the gripping-dies; a plunger for advancing the blank partly through said gripping-dies, so that its head portion may receive the action of the forming-dies; means to release the gripping-dies preliminary thereto; a pivoted lever connected to said plunger; a pitman articulated to said lever; and lever-and-cam mechanism for actuating said pitman, substantially as described.

19. In a bolt-machine, the combination, with a die-block through which the work is fed, of gripping-dies; toggles for closing said dies; means for opening said dies; a link connected to the die-closing toggles at one end; a block to which the opposite end of said link is connected; a wedge for actuating said block; a pitman pivoted to the wedge; cam-and-lever mechanism for actuating the pitman; and mechanism for heading the work, substantially as described.

20. In a bolt-machine, the combination, with a die-block having perforations, of means for feeding a stock-rod through one of said perforations; rod-gripping mechanism coöperative with the said block to cut off the stock and into blanks; wedge and toggle devices for actuating said gripping mechanism to sever a blank from the rod and to carry it to the position where it is headed and to there release the gripping action of the dies to permit the advance of the blank; preliminary heading dies or punches; means for slightly advancing the blank through the gripping-dies after it has been partially headed by said dies or punches; forming-dies; means for actuating said forming-dies; finishing heading dies or punches; means for returning the gripping-dies to the line of feed of the rod; means for opening the gripping mechanism prior to the feed; and means to actuate the heading dies or punches.

21. In a bolt-machine, the combination, with a die-block having perforations, one of which is provided with a cut-off bushing, of gripping-dies; toggles for actuating said dies in one direction; a link for actuating said toggles; means for opening said gripping-dies; wedge mechanism for actuating the link; and cam-and-lever devices for actuating the wedge, substantially as described.

22. The combination, with feed-rollers, of pawl-and-ratchet mechanism for actuating said feed-rollers; a sector for tripping the pawl; a pitman for actuating the sector; a pivoted lever to which the pitman is connected; a cam for actuating said lever in one direction; a spring for returning the lever; a perforated die-block having a cut-off bushing; a pair of gripping-dies; means for actuating the gripping-dies; a pair of forming-dies; toggle mechanism for opening and closing said gripping-dies; wedges for actuating the toggle mechanism; and means for reciprocating the wedges, substantially as described.

23. The combination with gripping-dies, of means to feed a blank thereto; means to shift said dies to move the blank into a position substantially parallel to its fed position; means for forming by successive steps a head upon the blank; forming-dies; and means for advancing the blank in the gripping-dies between the steps and placing the head under formation into position for engagement and support by the forming-dies during the succeeding steps.

24. In a machine for forming at successive steps a head upon a blank, the combination of blank-holding means, of means to feed a blank thereto; means to shift said holding means to move the blank into a position substantially parallel to its fed position; means for preliminarily upsetting the blank; means for moving the blank forward in the holding means after such upsetting; and means for embracing the rear of the upset portion and supporting it during the succeeding steps.

25. In a bolt-machine the combination with a die-block, of gripping mechanism embodying means coöperative with the die-blank to sever the stock rod; means to open and close the same and to move them across the die-block to sever a blank from a stock rod; heading mechanism; means to intermittently function the heading mechanism; forming-dies; means to actuate the same; and means to advance the blank through the gripping-dies while open and between functions of the heading mechanism to place its head out of contact with the gripping mechanism and in position to be acted upon by the forming-dies and thereby held against the thrust of the heading mechanism.

26. In a heading-machine the combination with a series of heading mechanisms, means to actuate the same, means to bring the members of such series consecutively into the working position of the machine, means to feed the stock rod, means to sever a blank therefrom and shift the same into a position in parallelism to the line of the feed movement and to hold the same during the action of a portion of said series of heading mechanisms, means to advance the blank in the axial line in which it is held, means to hold the same in such position for the action of the remainder of the series of heading mechanisms, and said forming-dies and means to actuate the same.

27. The combination with heading mechanism embodying a number of heading devices, means to actuate the same serially, means to feed the stock, means to sever a blank and carry it to a position parallel to the line of feed, means to control such blank and present it to the heading mechanisms at a number of points along the line upon which it is held, and side-forming dies and means to actutate the same.

28. The combination with heading mechanisms, means to feed a stock rod, means to sever a blank therefrom and shift it to a position in parallelism with its line of feed, means to perform a number of heading operations thereon while the blank is in a number of positions upon the line of such parallel position, and means to thereafter return the blank to a position in the line of the feed, and side-forming dies and means to actuate the same.

29. In a machine of the class described, the combination with means to feed a rod along its axial line, of means to cut off a blank and shift the same into a position with its axial line parallel to the line of its feed; heading mechanism; and means to present the blank thereto at a number of points in such parallel line, and side-forming dies and means to actuate the same.

ETHELBERT A. MOORE.
FRANKLIN HOLLAND.

Witnesses for E. A. Moore:
  ALBERT H. STARKEY,
  WM. H. BLODGETT.

Witnesses for Franklin Holland:
  J. NICHOLAS SEIFERT,
  GEO. E. TAYLOR.